H. C. HOWELLS.
DENTAL RUBBER DAM.

No. 175,706. Patented April 4, 1876.

Witnesses:
Theodore R. Davis.
Charles W. Kershaw

Inventor:
Henry Caink Howells

UNITED STATES PATENT OFFICE.

HENRY C. HOWELLS, OF FLUSHING, NEW YORK.

IMPROVEMENT IN DENTAL RUBBER DAMS.

Specification forming part of Letters Patent No. 175,706, dated April 4, 1876; application filed March 16, 1876.

*To all whom it may concern:*

Be it known that I, HENRY CRAIK HOWELLS, of Flushing, in Queens county, and State of New York, have invented a new and useful Improvement and Combination in Dental Instruments, which improvement and combination are fully set forth in the following specification, reference being had to the accompanying drawings.

The object of my invention is to attach a small reflector or mirror, such as is in use by dentists, to another instrument, also used by dentists, and known as a "dental dam," so as to employ both instruments in combination at the same time for their respective uses, and to render it unnecessary for the dentist to hold a mirror or reflector while operating with the dam. This I accomplish by attaching a reflector, suitably mounted or prepared for the purpose, to the inside of the dental dam in such a way or position that light shall be reflected by the mirror in the direction needed to facilitate the inspection or the operation of the dentist.

Figures 1, 2, and 3 in the accompanying drawings represent reflectors or mirrors, which may be of a circular or other convenient form.

In Fig. 1 the mirror is represented as mounted with a button or stud at its back, by which it is affixed to the dam by means of a button-hole cut for the occasion.

Figure 1:
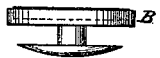
Figure 2:
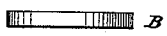
Fig. 2 shows a mirror with a plane back, which can be affixed to the dam by any suitable adhesive agent.
Figure 3:
Fig. 3 shows a mirror mounted with flexible metallic points, which, being pressed through the substance of the dam, are so bent as to clip and hold the mirror as placed.
Figure 4:
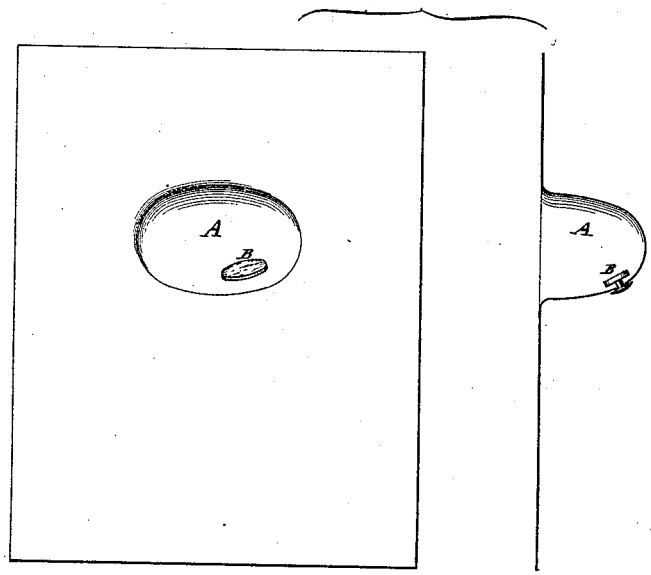
Fig. 4 represents Eleazer Parmly Brown's patent depressed rubber dam, which is a sheet of rubber having a depression, A, near its center, which, for certain dental purposes, is put into the mouth of the patient to dam away from the tooth operated on the saliva which would otherwise interfere with the work.

In the depression A the mirror B is represented as affixed to illustrate this my invention.

I claim as my invention—

In combination with a dental rubber dam, the mirror furnished with the attaching device B, or any equivalent thereof, all substantially as set forth.

HENRY CRAIK HOWELLS.

Witnesses:
   THEODORE R. DAVIS,
   CHARLES W. KERSHAW.